US008078901B1

(12) United States Patent
Meyer et al.

(10) Patent No.: US 8,078,901 B1
(45) Date of Patent: Dec. 13, 2011

(54) METHOD FOR INCREASING A PROCESSOR OPERATING FREQUENCY WHEN OTHER SUBSYSTEM DEMANDS ARE LOW

(75) Inventors: Alan T. Meyer, Anaheim Hills, CA (US); Kenny T. Coker, Corona, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 721 days.

(21) Appl. No.: 12/140,238

(22) Filed: Jun. 16, 2008

(51) Int. Cl.
*G06F 1/00* (2006.01)
(52) U.S. Cl. ........................................ 713/501; 713/300
(58) Field of Classification Search ................ 713/300, 713/501; 360/75
See application file for complete search history.

(56) References Cited

U.S. PATENT DOCUMENTS

| | | | |
|---|---|---|---|
| 5,345,347 A | 9/1994 | Hopkins et al. | |
| 5,369,771 A | 11/1994 | Gettel | |
| 5,452,277 A * | 9/1995 | Bajorek et al. | 369/53.18 |
| 5,544,138 A | 8/1996 | Bajorek et al. | |
| 5,638,541 A | 6/1997 | Sadashivaiah | |
| 5,682,273 A | 10/1997 | Hetzler | |
| 5,787,292 A | 7/1998 | Ottesen et al. | |
| 5,913,067 A | 6/1999 | Klein | |
| 5,954,820 A | 9/1999 | Hetzler | |
| 6,122,131 A * | 9/2000 | Jeppson | 360/77.02 |
| 6,161,187 A | 12/2000 | Mason et al. | |
| 6,192,480 B1 | 2/2001 | Barrus | |
| 6,378,081 B1 | 4/2002 | Hammond | |
| 6,608,729 B1 | 8/2003 | Willems et al. | |
| 6,657,811 B1 | 12/2003 | Codilian | |
| 6,725,385 B1 | 4/2004 | Chu et al. | |
| 6,845,456 B1 | 1/2005 | Menezes et al. | |
| 6,892,313 B1 | 5/2005 | Codilian et al. | |
| 6,928,559 B1 | 8/2005 | Beard | |
| 6,941,480 B1 | 9/2005 | Dai | |
| 6,990,594 B2 | 1/2006 | Kim | |
| 7,058,824 B2 | 6/2006 | Plante et al. | |
| 7,072,138 B2 | 7/2006 | Schmidt | |
| 7,089,432 B2 | 8/2006 | Schmidt | |
| 7,111,178 B2 | 9/2006 | Rusu et al. | |
| 7,120,806 B1 | 10/2006 | Codilian et al. | |
| 7,143,203 B1 | 11/2006 | Altmejd | |
| 7,155,617 B2 | 12/2006 | Gary et al. | |
| 7,174,469 B2 | 2/2007 | Luick | |
| 7,290,156 B2 | 10/2007 | Gaskins | |
| 7,302,595 B2 | 11/2007 | de Cesare et al. | |
| 7,609,472 B2 * | 10/2009 | Atkinson | 360/75 |

(Continued)

OTHER PUBLICATIONS

"Adaptive Power Management for Mobile Hard Drives," IBM Corporation, http://www.almaden.ibm.com/alumaden/mobile_hard_drives.hmtl, pp. 1-12, Jan. 1999. "Device Class Power Management Reference Specification," Microsoft Corporation, 2000.

*Primary Examiner* — Chun Cao
*Assistant Examiner* — Xuxing Chen

(57) ABSTRACT

A host activity measure indicative of a frequency of disk access commands received by a disk drive is determined, and then compared against a host activity threshold. A subsystem activity measure indicative of an activity level of a disk drive subsystem is also determined, and then compared against a subsystem activity threshold. Based at least in part on a determination that 1) the host activity measure is indicative of a greater frequency of disk access commands than the host activity threshold, and 2) the subsystem activity measure is indicative of less activity than the subsystem activity threshold, an operating frequency of a disk drive processor is increased.

28 Claims, 7 Drawing Sheets

U.S. PATENT DOCUMENTS

| | | |
|---|---|---|
| 2002/0169990 A1 | 11/2002 | Sherburne, Jr. |
| 2004/0083396 A1 | 4/2004 | Perahia |
| 2004/0109255 A1 | 6/2004 | Walz |
| 2005/0091425 A1 | 4/2005 | Wyatt et al. |
| 2005/0125704 A1 | 6/2005 | Brauer |
| 2005/0174678 A1 | 8/2005 | Zayas et al. |
| 2005/0218871 A1 | 10/2005 | Kang et al. |
| 2007/0083703 A1* | 4/2007 | Kolli et al. .................... 711/112 |
| 2007/0255967 A1* | 11/2007 | Jun ............................... 713/300 |

\* cited by examiner

METHOD FOR INCREASING A PROCESSOR OPERATING FREQUENCY WHEN OTHER SUBSYSTEM DEMANDS ARE LOW

BACKGROUND

Magnetic disk drives are conventionally designed to store large volumes of data on a plurality of disks mounted on a spindle assembly. Typically, each disk includes two disk surfaces capable of storing data. On each disk surface, user data is divided into groups of sectors and stored in concentric circular tracks located between an outside diameter and an inside diameter of the disk. Embedded servo information is recorded in servo sectors located in radially continuous narrow wedges along the disk surface.

In many disk drive applications, and especially in mobile applications, power conservation is critical. In order to reduce power consumption, many disk drives impose artificial limits on a maximum operating frequency of the disk drive microprocessor, since power consumption increases at higher frequencies. Moreover, many disk drives further decrease the operating frequency of the microprocessor during sleep modes and only increase the operating frequency when the disk drive is in an active mode.

Unfortunately, this strategy of frequency reduction may adversely affect a disk drive's performance. For example, when a host computer sends disk drive access commands that purport to measure a disk drive's I/O performance, the measured response time of the disk drive may be impacted due to the artificially limited operating frequency of the disk drive microprocessor.

There is therefore a need in the art for a method of efficiently improving the performance of disk drives by increasing the microprocessor operating frequency.

DETAILED DESCRIPTION

Figure 1:
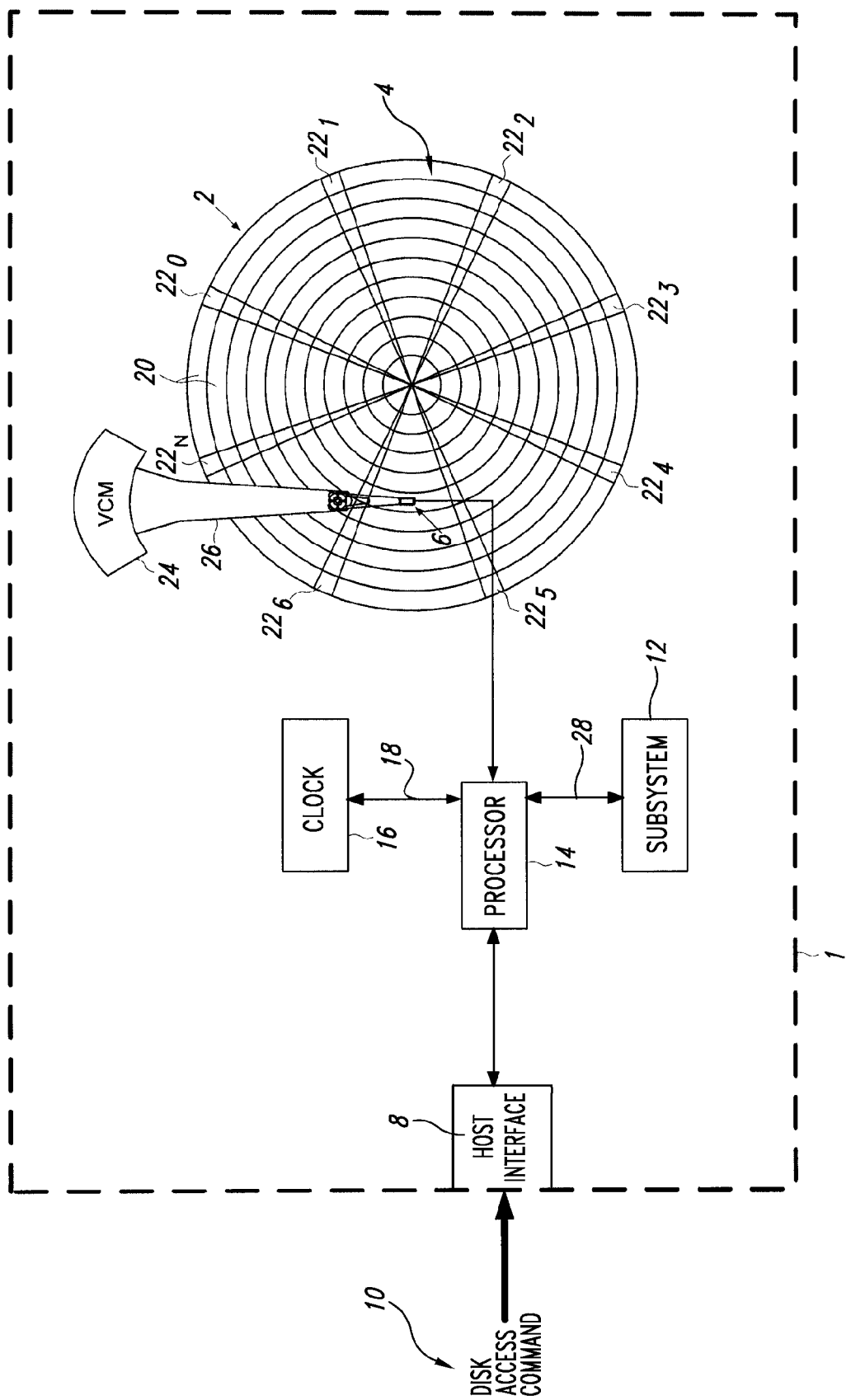
FIG. 1 is a schematic view generally illustrating an example disk drive, according to one illustrated embodiment.

Referring to FIG. 1, according to one embodiment, disk drive 1 comprises a disk 2 having a disk surface 4, and a head 6 actuatable over the disk surface 4 and operable to write to and read from the disk surface 4. The disk drive 1 further includes a host interface 8 configured to receive disk access commands 10 from a host computer (not shown) coupled to the disk drive 1. A host activity measure may be indicative of a frequency of the disk access commands 10. The disk drive 1 further includes a disk drive subsystem 12, where a subsystem activity measure may be indicative of an activity level of the subsystem 12. The disk drive 1 further includes a processor 14 configured to operate at an operating frequency, and a clock 16 coupled to the processor 14 and configured to generate an adjustable timing signal 18 to control the operating frequency. In one embodiment, the clock 16 may be operable to increase the operating frequency of the processor 14 based at least in part on: 1) the host activity measure being indicative of a greater frequency of disk access commands than a host activity threshold, and 2) the subsystem activity measure being indicative of less activity than a subsystem activity threshold. These components of the disk drive 1 are described in greater detail below.

As illustrated herein, the disk drive 1 comprises a magnetic disk drive, and the methods described herein will be described in terms of such a disk drive. However, the methods, circuitry and devices described herein may also be applied to and/or implemented in other disk drives, including, e.g., optical or magneto-optical disk drives.

The disk 2 may comprise any of a variety of magnetic or optical disk media. As illustrated, the disk 2 includes a disk surface 4, as well as an opposite disk surface not visible in FIG. 1. In one embodiment, the disk surface 4 comprises a plurality of generally concentric tracks 20 defined at least in part by a plurality of servo sectors $22_{0-N}$. In other embodiments, more disks may, of course, be included in the disk drive 1, and different disk surfaces of these disks may be used for data storage.

The head 6 is actuatable over the disk surface 4 and is operable to write to and read from the disk surface 4. In one embodiment, the head 6 is a magnetic recording head and includes a transducer (not illustrated). The transducer may include a writer and a read element. In magnetic recording applications, the transducer's writer may be of a longitudinal, tunneling or perpendicular design, and the read element of the transducer may be inductive or magneto-resistive. In optical or magneto-optical recording applications, the head 6 may include an objective lens and an active or passive mechanism for controlling a separation of the objective lens from the disk surface 4.

As illustrated, the disk drive 1 may further include a voice coil motor ("VCM") 24 for rotating one or more actuator arms 26 about a pivot in order to actuate the head 6 at different positions over the disk surface 4. Of course, other actuating mechanisms may also be used to move the head 6 relative to the disk surface 4.

The host interface 8 is configured to receive the disk access commands 10 from a host computer (not shown) coupled to the disk drive 1. In addition, the host interface 8 may receive a variety of other commands and data from and transmit status and data to the host computer. The host interface 8 may comply with any of a number of electrical engineering standards. In one embodiment, the host interface 8 may include a serial interface, such as a Serial Advanced Technology Attachment ("SATA") interface or a Serial Attached Small Computer System Interface ("SAS"). In another embodiment, a parallel interface may be used, such as an Advanced Technology Attachment/Integrated Drive Electronics ("ATA/ IDE") interface or a Small Computer System Interface ("SCSI").

The disk access commands 10 may comprise any of a variety of commands requesting that data be read from or written to the disk 2. Such disk access commands 10 may be distinguished from other types of commands that may be sent by the host computer, such as diagnostic commands or status requests. Depending upon the particular interface between the host computer and the disk drive 1, the disk access commands 10 may be formatted in a variety of ways.

In one embodiment, a host activity measure may be indicative of a frequency of the disk access commands 10. For example, the host activity measure may comprise a direct measurement of an average frequency of the disk access commands 10. Such a host activity measure may be expressed equivalently as an average frequency of or an average time interval between the disk access commands 10. In other embodiments, the host activity measure may comprise other metrics that are correlated with the frequency of the disk access commands 10. For example, the host activity measure may comprise an average frequency associated with all communications received from and/or sent to the host computer.

The disk drive 1 also includes at least one disk drive subsystem 12, which may comprise any of a variety of components and/or circuitry located within the disk drive 1 that consume power. For example, the subsystem 12 may comprise a channel subsystem, a servo subsystem, and/or another disk drive subsystem. As illustrated, the subsystem 12 may be communicatively coupled (directly or indirectly) with the processor 14 via an interface 28.

In one embodiment, a subsystem activity measure may be indicative of an activity level of the subsystem 12. For example, the subsystem activity measure may comprise an average frequency or average time interval associated with particular operations performed by the subsystem 12. In another embodiment, the subsystem activity measure may comprise an average current drawn by the subsystem 12. In yet another embodiment, the subsystem activity measure may comprise an average time-in-use of the subsystem 12. That is, the subsystem activity measure may equal a ratio of a time that the subsystem 12 is active to a total time. Of course, in other embodiments, the subsystem activity measure may comprise other metrics that are correlated with the activity level of the subsystem 12.

The processor 14 is configured to operate at an operating frequency. In one embodiment, the processor 14 may be packaged with a controller (not shown) and may be configured to execute one or more instructions in order to control certain operations performed by the disk drive 1.

The clock 16 is coupled to the processor 14 and may be configured to generate an adjustable timing signal 18 to control the operating frequency of the processor 14. The clock 16 may be located within the disk drive 1, as illustrated, or may be an external component. The clock 16 may also be configured to time other components and operations within the disk drive 1. However, in other embodiments, multiple clocks may be used.

The clock 16 may comprise any circuitry suitable for generating the adjustable timing signal 18. In one embodiment, the clock 16 may comprise a frequency generator. This frequency generator may be a voltage controlled oscillator ("VCO"), the frequency of which may be controlled by an input voltage. Alternatively, the frequency generator may comprise a plurality of multipliers and/or dividers coupled to a fixed reference clock (e.g., a crystal). The frequency of such a frequency generator may be controlled by selecting different combinations of the multipliers and dividers.

As described above, the clock 16 may be operable to increase the operating frequency of the processor 14 based at least in part on: 1) the host activity measure being indicative of a greater frequency of disk access commands than a host activity threshold, and 2) the subsystem activity measure being indicative of less activity than a subsystem activity threshold. The host activity threshold and the subsystem activity threshold may be selected in a variety of ways. In one embodiment, the thresholds are predetermined and stored on the disk drive 1. In another embodiment, the thresholds may be generated by the disk drive 1 based on particular characteristics of the disk drive 1 and may even be varied in accordance with real-time conditions.

In one embodiment, the clock 16 may be configured to increase the operating frequency of the processor 14 to a single, predetermined frequency. However, in other embodiments, the clock 16 may be configured to increase the operating frequency by a variable increase factor to any of a variety of operating frequencies.

In one embodiment, the disk drive 1 may be associated with a maximum energy allowance. This maximum energy allowance may correspond to a maximum electrical power that the disk drive 1 can draw. Each of the components of the disk drive 1 may be apportioned some percentage of the maximum energy allowance to meet their nominal electrical requirements. Of course, during operation of the disk drive 1, certain of the components may draw a greater or lesser percentage of the maximum energy allowance depending upon their current power requirements.

Figure 2:
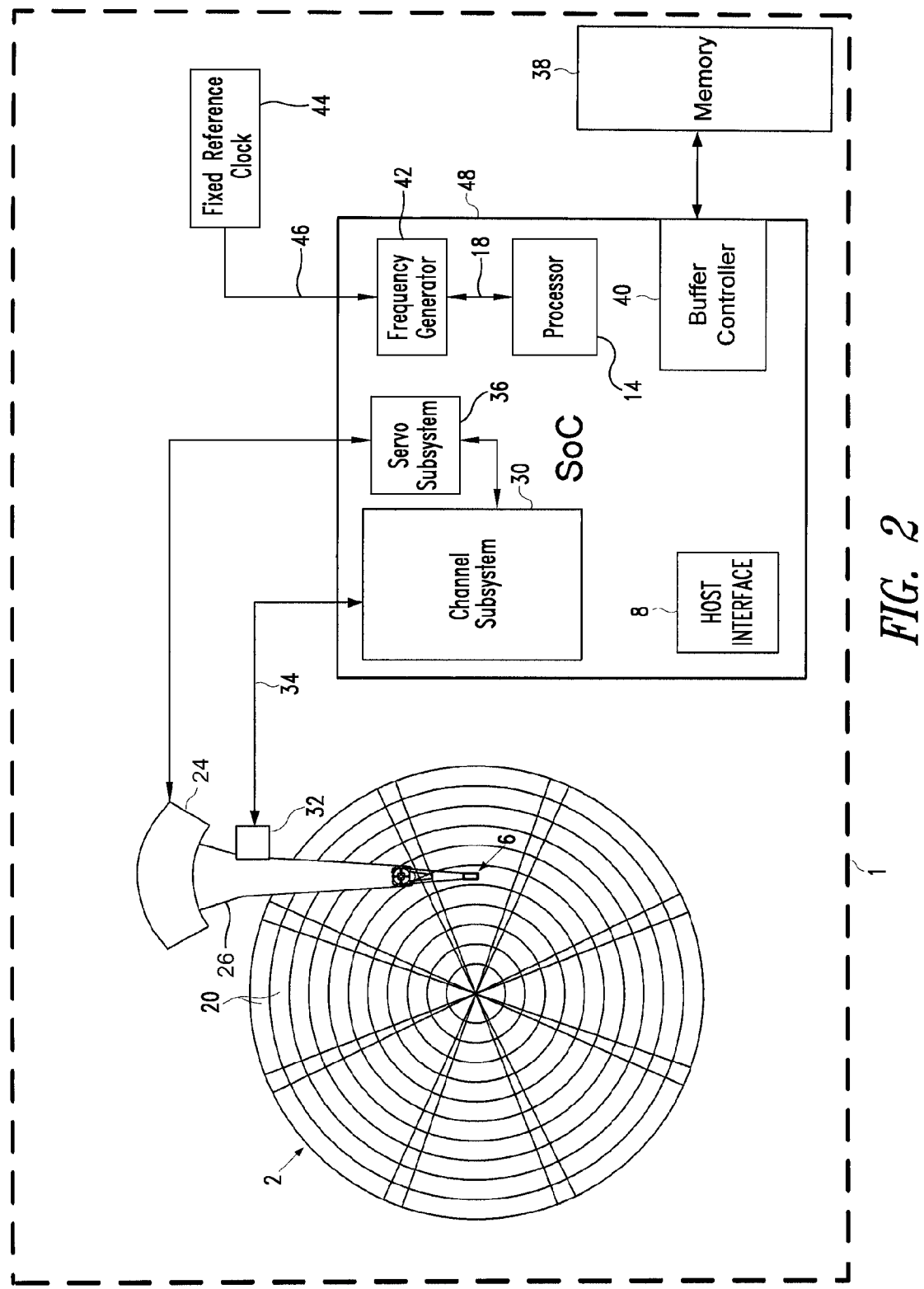
FIG. 2 is a schematic view illustrating in greater detail the example disk drive of FIG. 1, according to one illustrated embodiment.

Referring to FIG. 2, additional circuitry for controlling various functions of the disk drive 1 is illustrated in greater detail. However, in other embodiments, some of the illustrated circuitry may be omitted.

As illustrated in FIG. 2, the disk drive 1 may include a channel subsystem 30 (sometimes referred to as a "read channel"). The channel subsystem 30 may be coupled to a preamplifier 32 via a plurality of read and write lines 34. The preamplifier 32 may be located on the actuator 26 within the disk drive 1, or at a variety of other locations. During a read operation, the preamplifier 32 may amplify an analog signal detected by the head 6 in order to achieve a signal level that can be processed by the channel subsystem 30. The channel subsystem 30 may then receive the amplified signal via at least one of the lines 34 and further amplify, filter and convert the analog pulses into digital data that is output to a controller (not shown). During a write operation, the channel subsystem 30 may receive digital data from the controller and forward logical signals representative of this digital data to the preamplifier 32 via the lines 34. As is well known in the art, the channel subsystem 30 may be armed by firmware executed by the processor 14 for such read and write operations.

The disk drive 1 may further include a servo subsystem 36. In one embodiment, the servo subsystem 36 receives a position signal via the preamplifier 32 and the channel subsystem 30 and performs calculations to determine a current position of the head 6 over the disk surface 4. The servo subsystem 36 may then use these calculations in order to control the VCM 24, and thereby control the position of the head 6. The servo subsystem 36 may perform seek operations in order to move the head 6 from one track to another track, and may perform track following operations in order to keep the head 6 tracking over the same track 20. As is well known in the art, the servo subsystem 36 may be armed by firmware executed by the processor 14 for a seek operation.

The disk drive 1 may further include a memory 38, which may comprise any type of volatile or nonvolatile computer-readable memory, such as dynamic random access memory ("DRAM") or flash memory. As illustrated, the memory 38 may comprise a memory module separate and distinct from the disk surface 4. However, in other embodiments, various instructions executable by the processor 14 may be stored on the disk surface 4.

The memory 38 may have a variety of information stored thereon. This stored information may include: data read from the disk surface 4, data representative of operating parameters of the disk drive 1, and op codes of control programs for controlling operations performed by the processor 14. In one embodiment, the memory 38 may further include a circular buffer configured to log a plurality of time intervals, as described in greater detail below with reference to FIG. 5. In another embodiment, the memory 38 may include code that is executable by the processor 14 in order to cause the processor 14 to perform a number of acts enumerated and discussed in detail below with respect to FIGS. 3 and 4.

The disk drive 1 may further comprise a buffer controller 40 directly coupled to the memory 38. The buffer controller 40 arbitrates access to the memory 38 by other disk drive components.

In one embodiment, the disk drive 1 may include a frequency generator 42 (which, in one embodiment, comprises the clock 16). As described above, the frequency generator 42 may be coupled to a fixed reference clock 44 (e.g., a quartz crystal). The frequency generator 42 may include a plurality of multipliers and dividers for taking a reference clock signal 46 from the fixed reference clock 44 and generating an adjustable timing signal 18 to control an operating frequency of the processor 14. Although not shown, the frequency generator 42 may also generate other frequencies for controlling other circuitry within the disk drive 1. Alternatively, a plurality of frequency generators may receive reference clock signals from the fixed reference clock 44 and may thereby generate a plurality of different clock signals.

As illustrated, many of the circuit components may be incorporated into a system on a chip ("SoC") 48. Thus, a single piece of silicon may incorporate the functionality of many of the above-described components. In other embodiments, the circuit components described herein may be implemented on a printed circuit board as separate elements.

Figure 3:
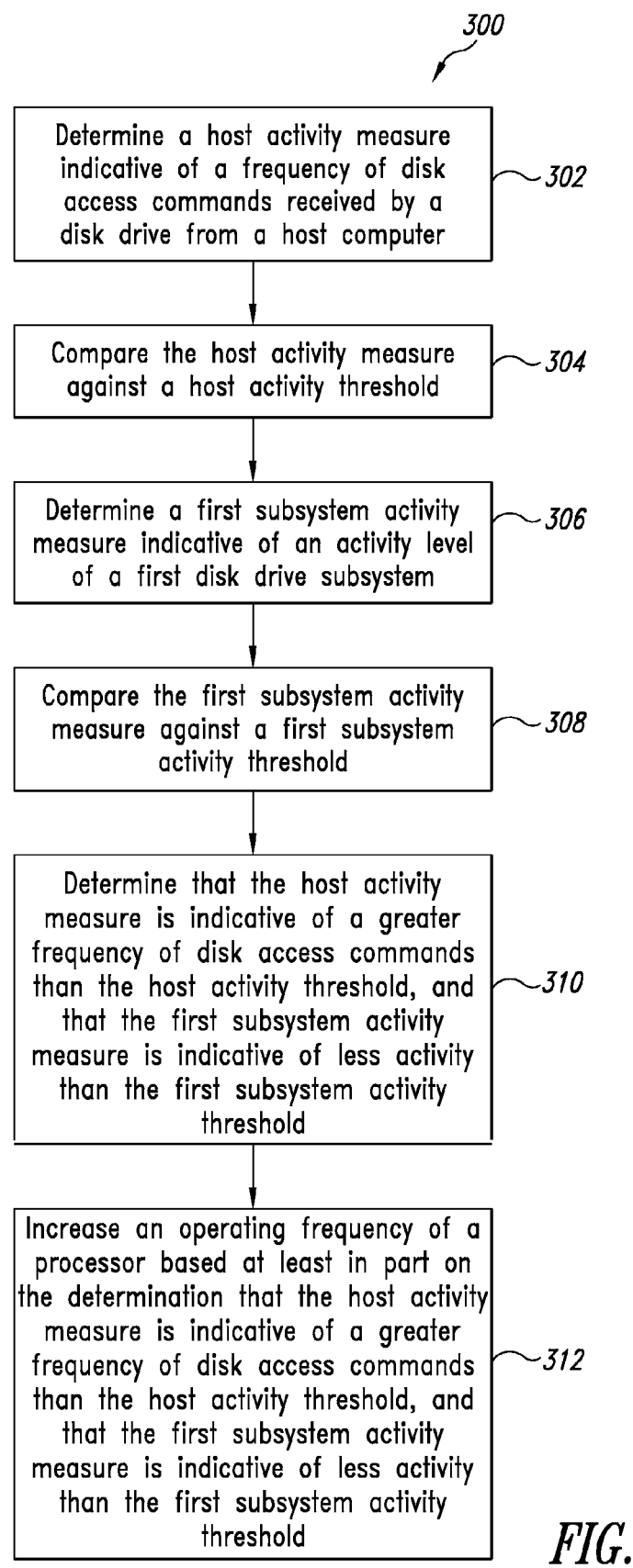
FIG. 3 is a flow chart illustrating one method of operating a disk drive having a processor and a first disk drive subsystem, according to one illustrated embodiment.

FIG. 3 illustrates a flow diagram for a method 300 of operating a disk drive, according to one embodiment. This method 300 will be discussed in the context of the disk drive 1 of FIGS. 1 and 2 with additional reference to FIGS. 5-7. However, the acts disclosed herein may be executed in a variety of different disk drives, in accordance with the described method.

As described herein, all of the acts comprising the method 300 may be orchestrated by the processor 14 based at least in part on computer-readable instructions stored in the memory 38. In other embodiments, a hardware implementation of all or some of the acts of the method 300 may be used instead.

At act 302, a host activity measure indicative of a frequency of disk access commands 10 received by a disk drive 1 from a host computer is determined. As described above, such disk access commands 10 may be received at the host interface 8 and may comprise any of a variety of commands requesting that data be read from or written to the disk 2. Such disk access commands 10 may also be received from any type of host computer.

In one embodiment, upon receipt of a disk access command 10, the disk drive 1 may process the disk access command 10 and perform a read or write operation specified by the disk access command 10. Once the read or write operation has been completed, the host interface 8 may transmit an appropriate response to the host computer. Each disk access command 10 may be considered completed when the host interface 8 has sent this response back to the host computer.

The host activity measure may comprise any of a variety of metrics indicative of a frequency of the disk access commands 10. In one embodiment, the host activity measure comprises an average time interval between completed disk access commands. Of course, in different embodiments, the frequency of the disk access commands 10 may be measured based upon any triggering event between the reception of a disk access command 10 and the completion of the disk access command 10. For example, the frequency of the disk access commands 10 may be measured based upon the time intervals between the reception times of new disk access commands 10. In other embodiments, the host activity measure may comprise other metrics that are correlated with the frequency of the disk access commands 10.

The host activity measure may be determined based on two or more disk access commands 10. In one embodiment, the host activity measure may be defined as a single time interval between a most recent disk access command 10 and an immediately preceding disk access command 10. In another embodiment, the host activity measure may comprise an average time interval between a number n of disk access commands 10. This number n may, of course, be varied in different embodiments.

Figure 5:
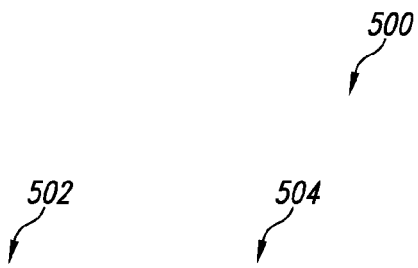
FIG. 5 is a table representative of example contents of a circular buffer for logging a plurality of time intervals between completed disk access commands, according to one illustrated embodiment.

A number of methods may be employed in order to determine the host activity measure. These methods may be orchestrated by the processor 14 or by other circuitry within the disk drive 1. As illustrated in FIG. 5, in one embodiment, the method may include logging a plurality of time intervals $TD_i$ in a circular buffer 500, each of the plurality of time intervals $TD_i$ indicative of time elapsed between consecutive completed disk access commands. An average of the plurality of time intervals $TD_i$ may then be calculated.

In one embodiment, the circular buffer 500 may include a command index 502 defining a number assigned to each disk access command 10 and an operation type 504 for each disk access command 10, in addition to the time intervals $TD_i$. Of course, the circular buffer 500 may store more or less information associated with the disk access commands 10.

In one embodiment, the circular buffer 500 may be stored within the memory 38, and the processor 14 may log the plurality of time intervals in the memory 38 and repeatedly calculate an average. For example, the average time interval may be calculated upon completion of each disk access command 10 in order to maintain a current average. The average time interval may, of course, be calculated by summing the plurality of time intervals $TD_i$ logged in the circular buffer 500 and dividing by the total number n of time intervals $TD_i$ logged therein. In other words, the average may be defined as:

$$AverageTimeInterval = \frac{\sum_1^n TD_i}{n}$$

In one embodiment, wherein the circular buffer has $2^k$ time intervals logged therein, the average of the time intervals may be calculated by shifting a sum of the plurality of time intervals by k. Such an operation may be completed with relatively minimal computational overhead.

Figure 6:
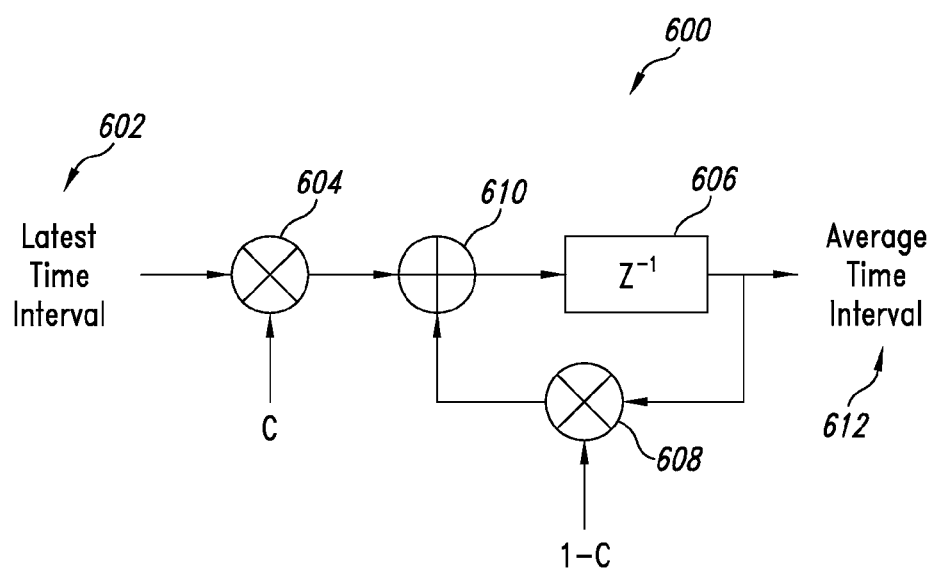
FIG. 6 is a schematic view of an infinite impulse response low pass filter, according to one illustrated embodiment.

As illustrated in FIG. 6, in another embodiment, the method may include passing a latest time interval 602 indicative of time elapsed between consecutive completed disk access commands 10 through an infinite impulse response ("IIR") low pass filter 600. This latest time interval 602 may be multiplied at a multiplier 604 by a variable C, which may comprise any number between zero and one. In some embodiments, the value of the variable C may be selected based upon desired characteristics of the IIR low pass filter 600. A previously calculated average time interval may be stored in a buffer 606, and, upon reception of the latest time interval 602, this previously calculated average time interval becomes the average time interval 612 output by the IIR low pass filter 600. This previously calculated average time interval may also be multiplied at a multiplier 608 by the quantity (1−C), and the result may be added to the result from the multiplier 604 at an adder 610. This newly calculated average time interval is then stored in the buffer 606 and may be output as the average time interval 612 at the arrival of a new time interval at the IIR low pass filter 600. Of course, other configurations for an IIR low pass filter may be used.

In one embodiment, the average time interval 612 output by the IIR low pass filter 600 may comprise the host activity measure. The IIR low pass filter 600 may be configured to reject high frequency, transient changes in the time intervals between consecutive completed disk access commands 10 while outputting an approximate average of the most recent time intervals.

Of course, in other embodiments, other circuits and other methods may be used in order to calculate an average frequency of or average time interval between disk access commands 10.

At act 304, the host activity measure is compared against a host activity threshold. The host activity threshold may be selected in a variety of ways. In one embodiment, the host activity threshold may be predetermined and stored on the disk drive 1. For example, the host activity threshold may be determined based upon simulations or empirical measurements associated with the disk drive 1. In another embodiment, the host activity threshold may be generated by the disk drive 1 (e.g., by the processor 14) based upon particular characteristics of the disk drive 1 and may even be varied in accordance with real-time conditions.

In one embodiment, the host activity measure may be compared against the host activity threshold by the processor 14. For example, the processor 14 may execute firmware in order to perform the comparison. However, in other embodiments, other circuitry within the disk drive 1 may perform the comparison.

At act 306, a first subsystem activity measure indicative of an activity level of a first disk drive subsystem 12 is determined. The first disk drive subsystem 12 may comprise any of a variety of subsystems. For example, the first disk drive subsystem 12 may comprise, inter alia, a channel subsystem 30 or a servo subsystem 36.

The first subsystem activity measure may comprise any of a variety of metrics indicative of an activity level of the first disk drive subsystem 12. For example, in one embodiment, the first subsystem activity measure comprises an average frequency or average time interval associated with particular operations performed by the first disk drive subsystem 12.

In an embodiment wherein the first disk drive subsystem 12 is the channel subsystem 30, the first subsystem activity measure may comprise an average time interval between consecutive operations of arming the channel subsystem 30 for a read or write operation. This first subsystem activity measure may be calculated in a manner similar to that described above with reference to the host activity measure, employing a circular buffer similar to the circular buffer 500 or an IIR low pass filter similar to the IIR low pass filter 600. In other embodiments, the first subsystem activity measure may be calculated based upon other operations performed by the channel subsystem 30. For example, the first subsystem activity measure may comprise an average time interval between consecutive operations of asserting a read or write gate associated with the channel subsystem 30.

In an embodiment wherein the first disk drive subsystem 12 is a servo subsystem 36, the first subsystem activity measure may comprise an average time interval between consecutive operations of arming the servo subsystem 36 for a seek operation. This first subsystem activity measure too may be calculated in a manner similar to that described above with reference to the host activity measure. In other embodiments, the first subsystem activity measure may be calculated based upon other operations performed by the servo subsystem 36.

The first subsystem activity measure may be determined based on two or more operations performed by the first disk drive subsystem 12. The number of operations used to calculate the first subsystem activity measure may, of course, be varied in different embodiments.

In one embodiment, the first subsystem activity measure may be determined and stored by the processor 14 using any of the methods described above. For example, the first subsystem activity measure may be calculated by the processor 14 based on timing associated with firmware that arms the channel subsystem 30 or servo subsystem 36. Of course, in other embodiments, other circuitry within the disk drive 1 may be operable to determine the first subsystem activity measure.

At act 308, the first subsystem activity measure is compared against a first subsystem activity threshold. The first subsystem activity threshold may be selected in a variety of ways. In one embodiment, the first subsystem activity threshold may be predetermined and stored on the disk drive 1. For example, the first subsystem activity threshold may be determined based upon simulations or empirical measurements. In another embodiment, the first subsystem activity threshold may be generated by the disk drive 1 (e.g., by the processor 14) based upon particular characteristics of the disk drive 1 and may even be varied in accordance with real-time conditions.

In one embodiment, the first subsystem activity measure may be compared against the first subsystem activity threshold by the processor 14. For example, the processor 14 may execute firmware in order to perform the comparison. However, in other embodiments, other circuitry within the disk drive 1 may perform the comparison.

At act 310, it is determined that the host activity measure is indicative of a greater frequency of disk access commands than the host activity threshold and that the first subsystem activity measure is indicative of less activity than the first subsystem activity threshold. In one embodiment, the processor 14 may execute firmware in order to make the above determination. In another embodiment, other circuitry within the disk drive 1 may make this determination.

In one embodiment, if the host activity measure comprises an average time interval between completed disk access commands, then it may be determined that the host activity measure is less than the host activity threshold at act 310. If the first subsystem activity measure comprises an average time interval between operations, then it may be determined that the first subsystem activity measure is greater than the first subsystem activity threshold at act 310. Of course, with different metrics and different thresholds, the measures may be greater than or less than the corresponding thresholds in order to satisfy the above determination.

In some embodiments, the disk drive 1 may be in a state in which it is receiving a large number of small block sequential access commands That is, consecutive disk access commands 10 received by the disk drive 1 may request read or write operations performed to consecutive data blocks (often located along a single track 18). In such a state, a relatively high frequency of disk access commands 10 may be received, while the first disk drive subsystem 12 may exhibit relatively low activity levels. For example, the servo subsystem 36 may be performing track following operations to keep the head 6 tracking over the desired track 20, and the channel subsystem 30 may be reading from or writing to the disk 2 relatively infrequently, as a number of data blocks may be read from the track 18 at one pass into a buffer.

At act 312, an operating frequency of a processor 14 is increased based at least in part on the determination that the host activity measure is indicative of a greater frequency of disk access commands than the host activity threshold and that the first subsystem activity measure is indicative of less activity than the first subsystem activity threshold. In one embodiment, the processor 14 may execute firmware in order to cause its own operating frequency to increase. For example, the processor 14 may cause the clock 16 to increase a frequency of the timing signal 18 that controls the operating frequency of the processor 14. In such an embodiment, a different set of multipliers and dividers of a frequency generator 42 may be activated (directly or indirectly) by the processor 14. In another embodiment, other circuitry within the disk drive 1 may orchestrate the increase in the operating frequency of the processor 14.

As described above, in one embodiment, the operating frequency of the processor 14 may be increased to a single, predetermined frequency. However, in other embodiments, the operating frequency may be increased by an increase factor to any of a variety of operating frequencies.

In one embodiment, when the first subsystem activity measure is indicative of less activity than the first subsystem activity threshold, the disk drive 1 as a whole may be using less than its maximum energy allowance. In such an embodiment, the increase factor by which the operating frequency is increased may be selected based at least in part on the maximum energy allowance. That is, the increase factor may be selected such that the disk drive's total energy expenditure after the operating frequency of the processor 14 is increased does not exceed the maximum energy allowance of the disk drive 1. Indeed, in one embodiment, a plurality of first subsystem activity thresholds may be employed, and the increase factor may be selected based at least in part on the maximum energy allowance of the disk drive 1 as well as which of the plurality of first subsystem activity thresholds has been exceeded.

In one embodiment, the operating frequency of the processor 14 may be increased based on a single determination that the host activity measure is indicative of a greater frequency of disk access commands than the host activity threshold, and that the first subsystem activity measure is indicative of less activity than the first subsystem activity threshold. However, in another embodiment, the operating frequency of the processor 14 may be increased based at least in part on a plurality of consecutive determinations that the host activity measure is indicative of a greater frequency of disk access commands than the host activity threshold, and that the first subsystem activity measure is indicative of less activity than the first subsystem activity threshold.

Figure 7:
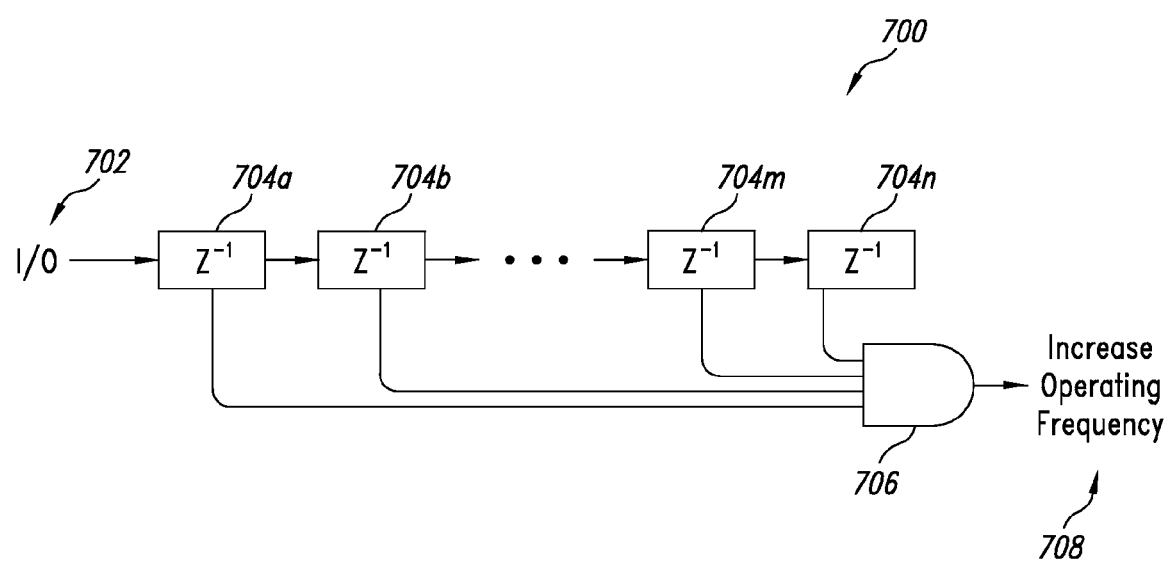
FIG. 7 is a schematic view of a history buffer for implementing hysteresis before increasing an operating frequency of a disk drive microprocessor, according to one illustrated embodiment.

As illustrated in FIG. 7, a history buffer 700 for implementing hysteresis may be used in order to monitor this plurality of consecutive determinations. In one embodiment, a binary decision (represented as 1 or 0) 702 serves as the input for the history buffer 700. This binary decision 702 is indicative of whether or not a most recent determination has been made that the host activity measure is indicative of a greater frequency of disk access commands than the host activity threshold, and that the first subsystem activity measure is indicative of less activity than the first subsystem activity threshold. As each new binary decision is made, more and more of buffers 704a through 704n (collectively 704) are filled. This plurality of buffers 704a through 704n may be coupled to AND gate 706. Thus, when all of the buffers 704 reflect the same determination (i.e., that the host activity measure is indicative of a greater frequency of disk access commands than the host activity threshold, and that the first subsystem activity measure is indicative of less activity than the first subsystem activity threshold), the history buffer 700 may provide an output 708 indicating that the operating frequency of the processor 14 should be increased. In this embodiment, the operating frequency of the processor 14 will not be increased if only a single determination in accordance with act 310 has been made.

Figure 4:
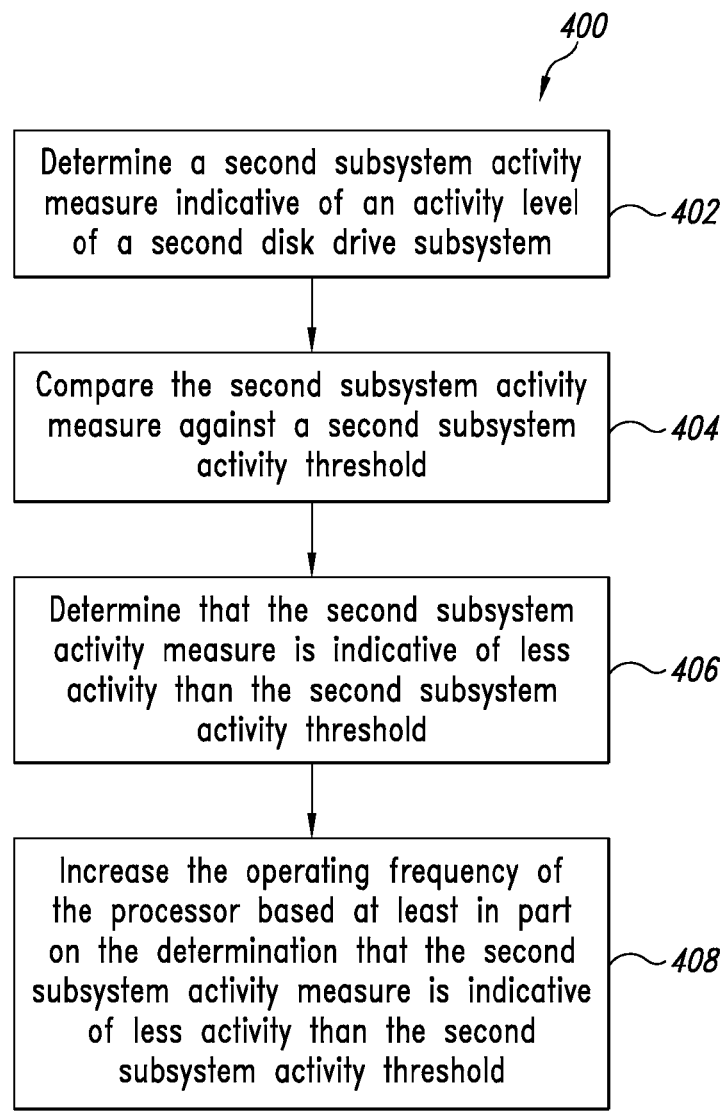
FIG. 4 is a flow chart illustrating additional acts that may be carried out in accordance with the method of FIG. 3, wherein the disk drive includes a second disk drive subsystem, according to one illustrated embodiment.

FIG. 4 illustrates a flow diagram for additional acts that may be performed in accordance with a method 400, according to one embodiment. As described herein, the method 400 may be performed in addition to those acts described above with respect to method 300.

As described herein, all of the acts comprising the method 400 may be orchestrated by the processor 14 based at least in part on computer-readable instructions stored in the memory 38. In other embodiments, a hardware implementation of all or some of the acts of the method 400 may be used instead.

At act 402, a second subsystem activity measure indicative of an activity level of a second disk drive subsystem is determined. The second disk drive subsystem may comprise any of a variety of disk drive subsystems. For example, the second disk drive subsystem may comprise a channel subsystem 30 or a servo subsystem 36. In one embodiment, the first disk drive subsystem discussed above with reference to the method 300 may comprise the channel subsystem 30, and the second disk drive subsystem may comprise the servo subsystem 36.

As discussed above with reference to act 306, the second subsystem activity measure may comprise any of a variety of metrics indicative of an activity level of the second disk drive subsystem. For example, in one embodiment, the second subsystem activity measure comprises an average frequency or time interval associated with particular operations performed by the second disk drive subsystem.

In one embodiment, the second subsystem activity measure may be determined and stored by the processor 14 using any of the methods described above. For example, the second subsystem activity measure may be calculated by the processor 14 based on timing associated with firmware that arms the channel subsystem 30 or servo subsystem 36. Of course, in other embodiments, other circuitry within the disk drive 1 may be operable to determine the second subsystem activity measure.

At act 404, the second subsystem activity measure is compared against a second subsystem activity threshold. The second subsystem activity threshold may be selected in a variety of ways. In one embodiment, the second subsystem activity threshold may be predetermined and stored on the disk drive 1. For example, the second subsystem activity threshold may be determined based upon simulations or empirical measurements. In another embodiment, the second subsystem activity threshold may be generated by the disk drive 1 (e.g., by the processor 14) based upon particular characteristics of the disk drive 1 and may even be varied in accordance with real-time conditions.

In one embodiment, the first subsystem activity threshold and the second subsystem activity threshold may comprise variable thresholds. For example, assuming that an increase in the operating frequency of the processor 14 results in some increased energy expenditure, the first and second subsystem activity thresholds may be varied in order to meet the needs of that increased energy expenditure without exceeding a maximum energy allowance of the disk drive 1. That is, the first subsystem activity threshold may be varied based at least in part on the second subsystem activity measure, and the second subsystem activity threshold may be varied based at least in part on the first subsystem activity measure. For example, if the second subsystem activity measure is indicative of sufficiently low activity levels, then the first subsystem activity threshold may be varied such that the first subsystem activity measure need not be indicative of very low activity levels.

In one embodiment, the second subsystem activity measure may be compared against the second subsystem activity threshold by the processor 14. For example, the processor 14 may execute firmware in order to perform the comparison. However, in other embodiments, other circuitry within the disk drive 1 may perform the comparison.

At act 406, it is determined that the second subsystem activity measure is indicative of less activity than the second subsystem activity threshold. In one embodiment, the processor 14 may execute firmware in order to make the above determination. In another embodiment, other circuitry within the disk drive 1 may make this determination.

Finally, at act 408, the operating frequency of the processor 14 is increased based at least in part on the determination that the second subsystem activity measure is indicative of less activity than the second subsystem activity threshold. In one embodiment, the operating frequency of the processor 14 may be increased based on the determination at act 406 in addition to the determinations at act 310.

As described above, in one embodiment, the processor 14 may execute firmware in order to cause its own operating frequency to increase. In other embodiments, other circuitry within the disk drive 1 may orchestrate this increase in the operating frequency.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

We claim:

1. A method of operating a disk drive having a processor and a first disk drive subsystem, the method comprising:
    determining a host activity measure indicative of a frequency of disk access commands received by the disk drive from a host computer;
    comparing the host activity measure against a host activity threshold;
    determining a first subsystem activity measure indicative of an activity level of the first subsystem;
    comparing the first subsystem activity measure against a first subsystem activity threshold;
    determining that the host activity measure is indicative of a greater frequency of disk access commands than the host activity threshold, and that the first subsystem activity measure is indicative of less activity than the first subsystem activity threshold; and
    increasing an operating frequency of the processor based at least in part on the determination that the host activity measure is indicative of a greater frequency of disk access commands than the host activity threshold, and that the first subsystem activity measure is indicative of less activity than the first subsystem activity threshold, wherein the first subsystem includes a servo subsystem of the disk drive, and wherein the first subsystem activity measure is an average time interval between consecutive operations of arming the servo subsystem for a seek operation.

2. The method of claim 1, wherein the host activity measure includes an average time interval between completed disk access commands.

3. The method of claim 2, wherein determining the host activity measure includes:
    logging a plurality of time intervals in a circular buffer, each of the plurality of time intervals indicative of time elapsed between consecutive completed disk access commands; and
    calculating an average of the plurality of time intervals.

4. The method of claim 3, wherein the average time interval is calculated upon completion of each disk access command.

5. The method of claim 1, wherein the first subsystem includes a channel subsystem of the disk drive, and wherein the first subsystem activity measure is an average time interval between consecutive operations of arming the channel subsystem for a read or write operation.

6. The method of claim 1, wherein the operating frequency of the processor is increased based at least in part on a plurality of consecutive determinations that the host activity measure is indicative of a greater frequency of disk access commands than the host activity threshold, and that the first subsystem activity measure is indicative of less activity than the first subsystem activity threshold.

7. The method of claim 1, wherein the operating frequency of the processor is increased by an increase factor based at least in part on a maximum energy allowance of the disk drive.

8. A method of operating a disk drive having a processor and a first disk drive subsystem, the method comprising:
    determining a host activity measure indicative of a frequency of disk access commands received by the disk drive from a host computer that includes an average time interval between completed disk access commands based on logging a plurality of time intervals in a circular buffer, each of the plurality of time intervals indicative of time elapsed between consecutive completed disk access commands and calculating an average of the plurality of time intervals wherein the circular buffer has $2^k$ time intervals logged therein, and calculating the average of the plurality of time intervals includes shifting a sum of the plurality of time intervals by k;
    comparing the host activity measure against a host activity threshold;
    determining a first subsystem activity measure indicative of an activity level of the first subsystem;
    comparing the first subsystem activity measure against a first subsystem activity threshold;
    determining that the host activity measure is indicative of a greater frequency of disk access commands than the host activity threshold, and that the first subsystem activity measure is indicative of less activity than the first subsystem activity threshold; and increasing an operating frequency of the processor based at least in part on the determination that the host activity measure is indicative of a greater frequency of disk access commands than the host activity threshold, and that the first subsystem activity measure is indicative of less activity than the first subsystem activity threshold.

9. A method of operating a disk drive having a processor and a first disk drive subsystem, the method comprising:

determining a host activity measure indicative of a frequency of disk access commands received by the disk drive from a host computer that includes an average time interval between completed disk access commands, wherein determining the host activity measure includes passing a time interval indicative of time elapsed between consecutive completed disk access commands through an infinite impulse response low pass filter;

comparing the host activity measure against a host activity threshold;

determining a first subsystem activity measure indicative of an activity level of the first subsystem;

comparing the first subsystem activity measure against a first subsystem activity threshold;

determining that the host activity measure is indicative of a greater frequency of disk access commands than the host activity threshold, and that the first subsystem activity measure is indicative of less activity than the first subsystem activity threshold; and increasing an operating frequency of the processor based at least in part on the determination that the host activity measure is indicative of a greater frequency of disk access commands than the host activity threshold, and that the first subsystem activity measure is indicative of less activity than the first subsystem activity threshold.

10. A method of operating a disk drive having a processor and a first disk drive subsystem, the method comprising:

determining a host activity measure indicative of a frequency of disk access commands received by the disk drive from a host computer;

comparing the host activity measure against a host activity threshold;

determining a first subsystem activity measure indicative of an activity level of the first subsystem;

comparing the first subsystem activity measure against a first subsystem activity threshold;

determining that the host activity measure is indicative of a greater frequency of disk access commands than the host activity threshold, and that the first subsystem activity measure is indicative of less activity than the first subsystem activity threshold; and increasing an operating frequency of the processor based at least in part on the determination that the host activity measure is indicative of a greater frequency of disk access commands than the host activity threshold, and that the first subsystem activity measure is indicative of less activity than the first subsystem activity threshold, wherein the first subsystem includes a channel subsystem of the disk drive, and wherein the first subsystem activity measure is an average time interval between consecutive operations of arming the channel subsystem for a read or write operation and wherein determining the first subsystem activity measure includes logging a plurality of time intervals in a circular buffer, each of the plurality of time intervals indicative of time elapsed between consecutive operations of arming the channel subsystem and calculating an average of the plurality of time intervals.

11. The method of claim 10, wherein the average time interval is calculated upon performing each operation of arming the channel subsystem.

12. The method of claim 10, wherein the circular buffer has $2^k$ time intervals logged therein and calculating the average of the plurality of time intervals includes shifting a sum of the plurality of time intervals by k.

13. A method of operating a disk drive having a processor and a first disk drive subsystem, the method comprising:

determining a host activity measure indicative of a frequency of disk access commands received by the disk drive from a host computer;

comparing the host activity measure against a host activity threshold;

determining a first subsystem activity measure indicative of an activity level of the first subsystem;

comparing the first subsystem activity measure against a first subsystem activity threshold;

determining that the host activity measure is indicative of a greater frequency of disk access commands than the host activity threshold, and that the first subsystem activity measure is indicative of less activity than the first subsystem activity threshold; and increasing an operating frequency of the processor based at least in part on the determination that the host activity measure is indicative of a greater frequency of disk access commands than the host activity threshold, and that the first subsystem activity measure is indicative of less activity than the first subsystem activity threshold, wherein the first subsystem includes a channel subsystem of the disk drive, wherein the first subsystem activity measure is an average time interval between consecutive operations of arming the channel subsystem for a read or write operation, and wherein determining the first subsystem activity measure includes passing a time interval indicative of time elapsed between consecutive operations of arming the channel subsystem through an infinite impulse response low pass filter.

14. A method of operating a disk drive having a processor and a first disk drive subsystem, the method comprising:

determining a host activity measure indicative of a frequency of disk access commands received by the disk drive from a host computer;

comparing the host activity measure against a host activity threshold;

determining a first subsystem activity measure indicative of an activity level of the first subsystem;

comparing the first subsystem activity measure against a first subsystem activity threshold;

determining that the host activity measure is indicative of a greater frequency of disk access commands than the host activity threshold, and that the first subsystem activity measure is indicative of less activity than the first subsystem activity threshold;

increasing an operating frequency of the processor based at least in part on the determination that the host activity measure is indicative of a greater frequency of disk access commands than the host activity threshold, and that the first subsystem activity measure is indicative of less activity than the first subsystem activity threshold;

determining a second subsystem activity measure indicative of an activity level of a second disk drive subsystem;

comparing the second subsystem activity measure against a second subsystem activity threshold; and determining that the second subsystem activity measure is indicative of less activity than the second subsystem activity threshold.

15. The method of claim 14, wherein the first subsystem is a channel subsystem and the second subsystem is a servo system.

16. The method of claim 14, wherein the first subsystem activity threshold and the second subsystem activity threshold are variable thresholds.

17. A disk drive comprising:
a disk having a disk surface;
a head actuatable over the disk surface and operable to write and read from the disk surface;
a host interface configured to receive disk access commands from a host computer coupled to the disk drive, the disk access commands being associated with a host activity measure indicative of a frequency of the disk access commands;
a first subsystem associated with a first subsystem activity measure indicative of an activity level of the first subsystem, wherein the first subsystem includes a servo subsystem of the disk drive;
a processor configured to operate at an operating frequency; and
a clock coupled to the processor and configured to generate an adjustable timing signal to control the operating frequency, the clock operable to increase the operating frequency based at least in part on the host activity measure being indicative of a greater frequency of disk access commands than a host activity threshold, and the first subsystem activity measure being indicative of less activity than a first subsystem activity threshold, wherein the first subsystem activity measure is an average time interval between consecutive operations of arming the servo subsystem for a seek operation.

18. The disk drive of claim 17, wherein the host activity measure includes an average time interval between completed disk access commands.

19. The disk drive of claim 18, further comprising a circular buffer configured to log a plurality of time intervals, each of the plurality of time intervals indicative of time elapsed between consecutive completed disk access commands.

20. The disk drive of claim 17, wherein the first subsystem includes a channel subsystem of the disk drive, and wherein the first subsystem activity measure is an average time interval between consecutive operations of arming the channel subsystem for a read or write operation.

21. The disk drive of claim 17, wherein the first subsystem includes a servo subsystem, and wherein the first subsystem activity measure is an average time interval between consecutive operations of arming the servo subsystem for a seek operation.

22. A disk drive comprising:
a disk having a disk surface;
a head actuatable over the disk surface and operable to write and read from the disk surface;
a host interface configured to receive disk access commands from a host computer coupled to the disk drive, the disk access commands being associated with a host activity measure indicative of a frequency of the disk access commands;
a first subsystem associated with a first subsystem activity measure indicative of an activity level of the first subsystem;
a processor configured to operate at an operating frequency;
a clock coupled to the processor and configured to generate an adjustable timing signal to control the operating frequency, the clock operable to increase the operating frequency based at least in part on the host activity measure being indicative of a greater frequency of disk access commands than a host activity threshold, and the first subsystem activity measure being indicative of less activity than a first subsystem activity threshold, wherein the host activity measure includes an average time interval between completed disk access commands; and
an infinite impulse response lowpass filter configured to filter a time interval indicative of time elapsed between consecutive completed disk access commands.

23. A disk drive comprising:
a disk having a disk surface;
a head actuatable over the disk surface and operable to write and read from the disk surface;
a host interface configured to receive disk access commands from a host computer coupled to the disk drive, the disk access commands being associated with a host activity measure indicative of a frequency of the disk access commands;
a first subsystem associated with a first subsystem activity measure indicative of an activity level of the first subsystem, wherein the first subsystem includes a channel subsystem of the disk drive;
a processor configured to operate at an operating frequency;
a clock coupled to the processor and configured to generate an adjustable timing signal to control the operating frequency, the clock operable to increase the operating frequency based at least in part on the host activity measure being indicative of a greater frequency of disk access commands than a host activity threshold, and the first subsystem activity measure being indicative of less activity than a first subsystem activity threshold, wherein the first subsystem activity measure is an average time interval between consecutive operations of arming the channel subsystem for a read or write operation; and
a circular buffer operable to log a plurality of time intervals, each of the plurality of time intervals indicative of time elapsed between the consecutive operations of arming the channel system.

24. A disk drive comprising:
a disk having a disk surface;
a head actuatable over the disk surface and operable to write and read from the disk surface;
a host interface configured to receive disk access commands from a host computer coupled to the disk drive, the disk access commands being associated with a host activity measure indicative of a frequency of the disk access commands;
a first subsystem associated with a first subsystem activity measure indicative of an activity level of the first subsystem, wherein the first subsystem includes a channel subsystem of the disk drive;
a processor configured to operate at an operating frequency;
a clock coupled to the processor and configured to generate an adjustable timing signal to control the operating frequency, the clock operable to increase the operating frequency based at least in part on the host activity measure being indicative of a greater frequency of disk access commands than a host activity threshold, and the first subsystem activity measure being indicative of less activity than a first subsystem activity threshold, wherein the first subsystem activity measure is an average time interval between consecutive operations of arming the channel subsystem for a read or write operation; and an infinite impulse response lowpass filter operable to filter a time interval indicative of time elapsed between consecutive operations or arming the channel subsystem.

25. A disk drive comprising:

a disk having a disk surface;

a head actuatable over the disk surface and operable to write and read from the disk surface;

a host interface configured to receive disk access commands from a host computer coupled to the disk drive, the disk access commands being associated with a host activity measure indicative of a frequency of the disk access commands;

a first subsystem associated with a first subsystem activity measure indicative of an activity level of the first subsystem;

a processor configured to operate at an operating frequency; and a clock coupled to the processor and configured to generate an adjustable timing signal to control the operating frequency, the clock operable to increase the operating frequency based at least in part on the host activity measure being indicative of a greater frequency of disk access commands than a host activity threshold, and the first subsystem activity measure being indicative of less activity than a first subsystem activity threshold; and a second subsystem associated with a second subsystem activity measure indicative of an activity level of the second subsystem, and wherein the clock is further operable to increase the operating frequency based at least in part on the second subsystem activity measure being indicative of less activity than a second subsystem activity threshold.

26. The disk drive of claim 25, wherein the first subsystem is a channel subsystem and the second subsystem is a servo system.

27. The disk drive of claim 25, wherein the first subsystem activity threshold and the second subsystem activity threshold are variable thresholds.

28. A disk drive comprising:

means for determining a host activity measure indicative of a frequency of disk access commands received by the disk drive from a host computer;

means for comparing the host activity measure against a host activity threshold;

means for determining a first subsystem activity measure indicative of an activity level of a first disk drive subsystem, wherein the first subsystem includes a servo subsystem of the disk drive;

means for comparing the first subsystem activity measure against a first subsystem activity threshold;

means for determining that the host activity measure is indicative of a greater frequency of disk access commands than the host activity threshold, and that the first subsystem activity measure is indicative of less activity than the first subsystem activity threshold; and means for increasing an operating frequency of a processor based at least in part on the determination that the host activity measure is indicative of a greater frequency of disk access commands than the host activity threshold, and that the first subsystem activity measure is indicative of less activity than the first subsystem activity threshold, wherein the first subsystem activity measure is an average time interval between consecutive operations of arming the servo subsystem for a seek operation.

* * * * *